United States Patent
Baldwin et al.

(10) Patent No.: US 9,536,451 B2
(45) Date of Patent: Jan. 3, 2017

(54) BONE CONDUCTION TAGS

(71) Applicant: AT&T Intellectual Property I, L.P., Atlanta, GA (US)

(72) Inventors: Christopher Baldwin, Algonquin, IL (US); Brian S. Amento, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 115 days.

(21) Appl. No.: 14/482,087

(22) Filed: Sep. 10, 2014

(65) Prior Publication Data
US 2016/0071382 A1  Mar. 10, 2016

(51) Int. Cl.
| | |
|---|---|
| *H04B 3/36* | (2006.01) |
| *G09B 21/00* | (2006.01) |
| *G06K 7/00* | (2006.01) |
| *B60Q 1/00* | (2006.01) |
| *A61M 21/00* | (2006.01) |
| *G08B 1/08* | (2006.01) |

(52) U.S. Cl.
CPC ............ *G09B 21/00* (2013.01); *G06K 7/00* (2013.01); *G09B 21/003* (2013.01); *G09B 21/007* (2013.01); *G08B 1/08* (2013.01)

(58) Field of Classification Search
CPC .... G06F 3/0416; G06F 3/0412; G06F 3/0488; G06F 3/04883; G08B 6/00
USPC ......... 340/457, 407.1; 345/173, 174; 600/28
See application file for complete search history.

(56) References Cited

U.S. PATENT DOCUMENTS

| | | |
|---|---|---|
| 3,629,521 A | 12/1971 | Puharich et al. |
| 4,048,986 A | 9/1977 | Ott |
| 4,340,778 A | 7/1982 | Cowans et al. |
| 4,421,119 A | 12/1983 | Pratt |
| 4,720,607 A | 1/1988 | de Moncuit |
| 4,754,763 A | 7/1988 | Doemland |
| 4,799,498 A | 1/1989 | Collier |
| 5,024,239 A | 6/1991 | Rosenstein |
| 5,073,950 A | 12/1991 | Colbert et al. |

(Continued)

FOREIGN PATENT DOCUMENTS

| | | |
|---|---|---|
| AU | 2003257031 | 2/2004 |
| AU | 2007200415 | 8/2007 |

(Continued)

OTHER PUBLICATIONS

U.S. Office Action dated Mar. 8, 2010 in U.S. Appl. No. 11/586,142.

(Continued)

*Primary Examiner* — Jack K Wang
(74) *Attorney, Agent, or Firm* — Hartman & Citrin LLC

(57) ABSTRACT

Concepts and technologies are disclosed herein for bone conduction tags. According to one aspect of the concepts and technologies disclosed herein, a device can receive, via a transducer, a vibration signal from a body of a user. The vibration signal can be generated in response to the user interacting with a bone conduction tag. For example, the vibration signal can be generated in response to the user moving one or more fingers across the bone conduction tag. The device can analyze the vibration signal to determine an action that is to be performed. The device can perform the action or can instruct a further device to perform the action.

20 Claims, 7 Drawing Sheets

(56) References Cited

U.S. PATENT DOCUMENTS

| | | |
|---|---|---|
| 5,319,747 A | 6/1994 | Gerrissen et al. |
| 5,327,506 A | 7/1994 | Stites, III |
| 5,368,044 A | 11/1994 | Cain et al. |
| 5,495,241 A | 2/1996 | Doing et al. |
| 5,615,681 A | 4/1997 | Ohtomo |
| 5,664,227 A | 9/1997 | Mauldin et al. |
| 5,720,290 A | 2/1998 | Buhler |
| 5,749,363 A | 5/1998 | Ishii |
| 5,766,208 A | 6/1998 | Mcewan |
| 5,810,731 A | 9/1998 | Sarvazyan et al. |
| 5,836,876 A | 11/1998 | Dimarogonas |
| 6,024,711 A | 2/2000 | Lentle |
| 6,115,482 A | 9/2000 | Sears et al. |
| 6,135,951 A | 10/2000 | Richardson et al. |
| 6,151,208 A | 11/2000 | Bartlett |
| 6,213,934 B1 | 4/2001 | Bianco |
| 6,234,975 B1 | 5/2001 | Mcleod et al. |
| 6,336,045 B1 | 1/2002 | Brooks |
| 6,380,923 B1 | 4/2002 | Fukumoto |
| 6,396,930 B1 | 5/2002 | Vaudrey et al. |
| 6,409,684 B1 | 6/2002 | Wilk |
| 6,507,662 B1 | 1/2003 | Brooks |
| 6,580,356 B1 | 6/2003 | Alt et al. |
| 6,589,287 B2 | 7/2003 | Lundborg |
| 6,631,197 B1 | 10/2003 | Taenzer |
| 6,754,472 B1 | 6/2004 | Williams et al. |
| 6,783,501 B2 | 8/2004 | Takahashi et al. |
| 6,844,660 B2 | 1/2005 | Scott |
| 6,898,299 B1 | 5/2005 | Brooks |
| 7,010,139 B1 | 3/2006 | Smeehuyzen |
| 7,123,752 B2 | 10/2006 | Kato et al. |
| 7,148,879 B2 | 12/2006 | Amento et al. |
| 7,198,607 B2 | 4/2007 | Jamsen |
| 7,206,423 B1 | 4/2007 | Feng et al. |
| 7,232,416 B2 | 6/2007 | Czernicki |
| 7,370,208 B2 | 5/2008 | Levin et al. |
| 7,405,725 B2 | 7/2008 | Mohri et al. |
| 7,536,557 B2 | 5/2009 | Murakami et al. |
| 7,539,533 B2 | 5/2009 | Tran |
| 7,615,018 B2 | 11/2009 | Nelson et al. |
| 7,625,315 B2 | 12/2009 | Hickman |
| 7,648,471 B2 | 1/2010 | Hobson |
| 7,671,351 B2 | 3/2010 | Setlak et al. |
| 7,708,697 B2 | 5/2010 | Wilkinson et al. |
| 7,760,918 B2 | 7/2010 | Bezvershenko et al. |
| 7,778,848 B1 | 8/2010 | Reeves |
| 7,796,771 B2 | 9/2010 | Calhoun et al. |
| 7,878,075 B2 | 2/2011 | Johansson et al. |
| 7,914,468 B2 | 3/2011 | Shalon et al. |
| 7,918,798 B2 | 4/2011 | Wu |
| 8,023,669 B2 | 9/2011 | Segev et al. |
| 8,023,676 B2 | 9/2011 | Abolfathi et al. |
| 8,031,046 B2 | 10/2011 | Franza et al. |
| 8,098,129 B2 | 1/2012 | Falck et al. |
| 8,196,470 B2 | 6/2012 | Gross et al. |
| 8,200,289 B2 | 6/2012 | Joo et al. |
| 8,253,693 B2 | 8/2012 | Buil et al. |
| 8,270,637 B2 | 9/2012 | Abolfathi |
| 8,270,638 B2 | 9/2012 | Abolfathi et al. |
| 8,312,660 B1 | 11/2012 | Fujisaki |
| 8,348,936 B2 | 1/2013 | Trembly et al. |
| 8,421,634 B2 | 4/2013 | Tan et al. |
| 8,467,742 B2 | 6/2013 | Hachisuka et al. |
| 8,482,488 B2 | 7/2013 | Jannard |
| 8,491,446 B2 | 7/2013 | Hinds et al. |
| 8,500,271 B2 | 8/2013 | Howell et al. |
| 8,521,239 B2 | 8/2013 | Hosoi et al. |
| 8,540,631 B2 | 9/2013 | Penner et al. |
| 8,542,095 B2 | 9/2013 | Kamei |
| 8,560,034 B1 | 10/2013 | Diab et al. |
| 8,594,568 B2 | 11/2013 | Falck |
| 8,750,852 B2 | 6/2014 | Forutanpour et al. |
| 8,922,427 B2 | 12/2014 | Dehnie et al. |
| 9,386,962 B2 | 7/2016 | Dahl |
| 2001/0013546 A1 | 8/2001 | Ross |
| 2001/0051776 A1 | 12/2001 | Lenhardt |
| 2003/0048915 A1 | 3/2003 | Bank |
| 2003/0066882 A1 | 4/2003 | Ross |
| 2003/0125017 A1 | 7/2003 | Greene et al. |
| 2003/0133008 A1 | 7/2003 | Stephenson |
| 2004/0152440 A1 | 8/2004 | Yoda et al. |
| 2005/0210269 A1 | 9/2005 | Tiberg |
| 2006/0018488 A1 | 1/2006 | Viala et al. |
| 2006/0132455 A1 | 6/2006 | Rimas-Ribikauskas |
| 2006/0149337 A1 | 7/2006 | John |
| 2007/0012507 A1 | 1/2007 | Lyon |
| 2007/0142874 A1 | 6/2007 | John |
| 2008/0064955 A1 | 3/2008 | Miyajima |
| 2008/0223925 A1 | 9/2008 | Saito et al. |
| 2008/0260211 A1 | 10/2008 | Bennett et al. |
| 2009/0149722 A1 | 6/2009 | Abolfathi et al. |
| 2009/0228791 A1 | 9/2009 | Kim |
| 2009/0234262 A1 | 9/2009 | Reid, Jr. et al. |
| 2009/0287485 A1 | 11/2009 | Glebe |
| 2009/0289958 A1 | 11/2009 | Kim et al. |
| 2009/0309751 A1 | 12/2009 | Kano et al. |
| 2010/0016741 A1 | 1/2010 | Mix et al. |
| 2010/0066664 A1 | 3/2010 | Son et al. |
| 2010/0137107 A1 | 6/2010 | Jamsa et al. |
| 2010/0162177 A1 | 6/2010 | Eves et al. |
| 2010/0168572 A1 | 7/2010 | Sliwa et al. |
| 2010/0286571 A1 | 11/2010 | Allum et al. |
| 2010/0297944 A1 | 11/2010 | Lee |
| 2010/0315206 A1 | 12/2010 | Schenk et al. |
| 2010/0316235 A1 | 12/2010 | Park et al. |
| 2010/0328033 A1 | 12/2010 | Kamei |
| 2011/0022025 A1 | 1/2011 | Savoie et al. |
| 2011/0125063 A1 | 5/2011 | Shalon et al. |
| 2011/0134030 A1 | 6/2011 | Cho |
| 2011/0135106 A1 | 6/2011 | Yehuday et al. |
| 2011/0137649 A1 | 6/2011 | Rasmussen et al. |
| 2011/0152637 A1 | 6/2011 | Kateraas et al. |
| 2011/0155479 A1 | 6/2011 | Oda |
| 2011/0227856 A1 | 9/2011 | Corroy et al. |
| 2011/0245669 A1 | 10/2011 | Zhang |
| 2011/0255702 A1 | 10/2011 | Jensen |
| 2011/0260830 A1 | 10/2011 | Weising |
| 2011/0269601 A1 | 11/2011 | Nelson et al. |
| 2011/0276312 A1 | 11/2011 | Shalon |
| 2011/0282662 A1 | 11/2011 | Aonuma et al. |
| 2012/0010478 A1 | 1/2012 | Kinnunen et al. |
| 2012/0011990 A1 | 1/2012 | Mann |
| 2012/0058859 A1 | 3/2012 | Elsom-Cook et al. |
| 2012/0065477 A1 | 3/2012 | Enomoto |
| 2012/0065506 A1 | 3/2012 | Smith |
| 2012/0202479 A1 | 8/2012 | Sugitani et al. |
| 2012/0212441 A1 | 8/2012 | Christiansson et al. |
| 2012/0280900 A1 | 11/2012 | Wang et al. |
| 2012/0290832 A1 | 11/2012 | Antequera Rodriguez et al. |
| 2013/0034238 A1 | 2/2013 | Abolfathi |
| 2013/0041235 A1 | 2/2013 | Rogers et al. |
| 2013/0119133 A1 | 5/2013 | Michael et al. |
| 2013/0120458 A1 | 5/2013 | Celebisoy et al. |
| 2013/0135223 A1 | 5/2013 | Shai |
| 2013/0142363 A1 | 6/2013 | Amento et al. |
| 2013/0171599 A1 | 7/2013 | Bleich et al. |
| 2013/0173926 A1 | 7/2013 | Morese et al. |
| 2013/0212648 A1 | 8/2013 | Tietjen et al. |
| 2013/0215060 A1 | 8/2013 | Nakamura |
| 2013/0225915 A1 | 8/2013 | Redfield et al. |
| 2013/0225940 A1 | 8/2013 | Fujita et al. |
| 2013/0278396 A1 | 10/2013 | Kimmel |
| 2013/0288655 A1 | 10/2013 | Foruntanpour et al. |
| 2013/0346620 A1 | 12/2013 | Gizis et al. |
| 2014/0009262 A1 | 1/2014 | Robertson et al. |
| 2014/0028604 A1 | 1/2014 | Morinaga et al. |
| 2014/0035884 A1* | 2/2014 | Oh ............... G06F 3/03545 345/179 |
| 2014/0097608 A1 | 4/2014 | Buzhardt et al. |
| 2014/0099991 A1 | 4/2014 | Cheng et al. |
| 2014/0107531 A1 | 4/2014 | Baldwin |
| 2014/0168093 A1 | 6/2014 | Lawrence |
| 2014/0168135 A1 | 6/2014 | Saukko et al. |
| 2014/0174174 A1 | 6/2014 | Uehara et al. |

(56) References Cited

U.S. PATENT DOCUMENTS

| | | | |
|---|---|---|---|
| 2014/0188561 A1 | 7/2014 | Tenbrock et al. | |
| 2014/0210791 A1 | 7/2014 | Hanauer et al. | |
| 2014/0240124 A1 | 8/2014 | Bychkov | |
| 2015/0084011 A1* | 3/2015 | Park | C23C 14/042 257/40 |
| 2015/0092962 A1 | 4/2015 | Amento et al. | |
| 2015/0120465 A1 | 4/2015 | Baldwin et al. | |
| 2015/0128094 A1 | 5/2015 | Baldwin et al. | |
| 2015/0137936 A1 | 5/2015 | Baldwin et al. | |
| 2015/0137960 A1 | 5/2015 | Baldwin et al. | |
| 2015/0138062 A1 | 5/2015 | Baldwin et al. | |
| 2015/0150116 A1 | 5/2015 | Baldwin et al. | |
| 2015/0199950 A1* | 7/2015 | Heiman | G10K 11/002 381/71.1 |

FOREIGN PATENT DOCUMENTS

| | | |
|---|---|---|
| CA | 1207883 | 7/1986 |
| EP | 0712114 | 5/1996 |
| EP | 0921753 | 6/1999 |
| EP | 1436804 | 2/2004 |
| EP | 2312997 | 4/2011 |
| EP | 2643981 | 5/2012 |
| EP | 2483677 | 8/2012 |
| GB | 2226931 | 7/1990 |
| GB | 2348086 | 9/2000 |
| JP | 02249017 | 10/1990 |
| JP | 04-317638 A | 11/1992 |
| JP | 2003058190 | 2/2003 |
| JP | 2005142729 | 6/2005 |
| JP | 2010210730 | 9/2010 |
| KR | 20100056688 | 10/1990 |
| TW | 200946887 | 8/1997 |
| WO | WO 8201329 | 4/1982 |
| WO | WO 9601585 | 1/1996 |
| WO | WO 03033882 | 4/2003 |
| WO | WO 2006094372 | 9/2006 |
| WO | WO 2009001881 | 12/2008 |
| WO | WO 2010045158 | 4/2010 |
| WO | WO 2012168534 | 12/2012 |

OTHER PUBLICATIONS

U.S. Office Action dated Aug. 12, 2010 in U.S. Appl. No. 11/586,142.
Examiner's Answer to Appeal Brief dated Apr. 22, 2011 in U.S. Appl. No. 11/586,142.
Patent Board Decision on Appeal dated Sep. 25, 2014 in U.S. Appl. No. 11/586,142.
Notice of Allowance dated Dec. 18, 2014 in U.S. Appl. No. 11/586,142.
Harrison et al., "Acoustic Barcodes: Passive, Durable and Inexpensive Notched Identification Tags," Proceedings of the 25th Annual ACM Symposium on User Interface Software and Technology, Oct. 7-10, 2012, ACM, Cambridge, MA.
Yoo et al., "Analysis of Body Sensor Network Using Human Body as the Channel," Proceedings of the ICST 3rd International Conference on Body Area Networks, 2008, Institute for Computer Sciences, Social-Informatics and Telecommunications Engineering.
Harrison et al., "Skinput: Appropriating the Body as an Input Surface," Proceedings of the SIGCHI Conference on Human Factors in Computing Systems, Apr. 10-15, 2010, ACM, Atlanta, GA.
Mujibiya et al., "The Sound of Touch: On-body Touch and Gesture Sensing Based on Transdermal Ultrasound Propagation," Proceedings of the 2013 ACM International Conference on Interactive Tabletops and Surfaces, Oct. 6-9, 2013, ACM, St. Andrews, United Kingdom.
Ni et al., "Disappearing Mobile Devices," Proceedings of the 22nd Annual ACM Symposium on User Interface Software and Technology, Oct. 4-7, 2009, ACM, Victoria, British Columbia, Canada.
Zhong et al., "OsteoConduct: Wireless Body-Area Communication based on Bone Conduction," Proceeding of the ICST 2nd International Conference on Body Area Networks, BodyNets 2007.
Travis et al., "Hambone: A bio-acoustic gesture interface," 2007 11th IEEE International Symposium on Wearable Computers, 2007.
Scanlon, Michael V. Acoustic sensor for health status monitoring. Army Research Lab Aberdeen Proving Ground MD, 1998.
Yamada, Guillaume Lopez; Masaki Shuzo; Ichiro. "New healthcare society supported by wearable sensors and information mapping-based services." International Journal of Networking and Virtual Organisations 9.3 (2011): 233-247.
Scanlon, Michael V. "Acoustic sensors in the helmet detect voice and physiology." AeroSense 2003. International Society for Optics and Photonics, 2003.
Amento et al., "The Sound of One Hand: A Wrist-Mounted Bio-Acoustic Fingertip Gesture Interface," Short Talk: It's All About Sound, CHI 2002.
"Kinect Gestures," retrieved from http://support.xbox.com/en-US/xbox-360/kinect/body-controller on Oct. 24, 2013.
Mark Billinghurst, "Chapter 14: Gesture Based Interaction," Haptic Input, Aug. 24, 2011.
Kompis, Martin, and Rudolf Haeusler, "Electromagnetic interference of bone-anchored hearing aids by cellular phones revisited," Acta oto-laryngologica 122.5, 2002, 510-512.
T. Scott Saponas, et al., "Enabling always-available input with muscle-computer interfaces," Proceedings of the 22nd Annual ACM Symposium on User Interface Software and Technology, ACM, 2009.
Jao Henrique Donker, "The Body as a communication medium," 2009.
Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.
Vidya Bharrgavi, et al., "Security Solution for Data Integrity in Wireless BioSensor Networks," Distributed Computing Systems Workshops, 2007, ICDCSW'07, 27th International Conference, IEEE, 2007.
Daniel Halperin, et al., "Pacemakers and Implantable Cardiac Defibrillators: Software Radio Attacks and Zero-Power Defenses," Security and Privacy, SP 2008, IEEE Symposium, IEEE, 2008.
Carmen C. Y. Poon, et al., "A Novel Biometrics Method to Secure Wireless Body Area Sensor Networks for Telemedicine and M-Health," Communications Magazine, IEEE 44.4, 2006, 73-81.
Zicheng Liu, et al., "Direct Filtering for Air- and Bone-Conductive Microphones," Multimedia Signal Processing, 2004 IEEE 6th Workshop, IEEE, 2004.
"Hinckley, Ken, and Hyunyoung Song, Sensor synaesthesia: touch in motion, and motion in touch." Proceedings of the SIGCHI Conference on Human Factors in Computing Systems. ACM, 2011.
Hinge, Dhanashree, and S. D. Sawarkar. "Mobile to Mobile data transfer through Human Area Network." IJRCCT 2.11 (2013): 1181-1184.
Park, Duck Gun, et al. "TAP: touch-and-play." Proceedings of the SIGCHI conference on Human Factors in computing systems. ACM, 2006.
Ruiz, J. Agud, and Shigeru Shimamoto. "A study on the transmission characteristics of the human body towards broadband intra-body communications." Consumer Electronics, 2005.(ISCE 2005). Proceedings of the Ninth International Symposium on. IEEE, 2005.
Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.
Lipkova, Jolana, and Jaroslav Cechak. "Transmission of Information Using the Human Body."
Maruf, Md Hasan. "An Input Amplifier for Body-Channel Communication." (2013).
Rekimoto, Jun. "Gesturewrist and gesturepad: Unobtrusive wearable interaction devices." Wearable Computers, 2001. Proceedings. Fifth International Symposium on. IEEE, 2001.
U.S. Office Action dated Feb. 13, 2013 in U.S. Appl. No. 13/309,124.

(56) References Cited

OTHER PUBLICATIONS

U.S. Office Action dated Sep. 24, 2013 in U.S. Appl. No. 13/309,124.
U.S. Office Action dated Jan. 29, 2014 in U.S. Appl. No. 13/309,124.
U.S. Office Action dated Aug. 25, 2015 in U.S. Appl. No. 11/586,142.
U.S. Office Action dated Aug. 25, 2015 in U.S. Appl. No. 14/083,094.
U.S. Office Action dated Jun. 25, 2015 in U.S. Appl. No. 14/083,110.
U.S. Appl. No. 14/482,091, filed Sep. 10, 2014.
U.S. Appl. No. 14/482,101, filed Sep. 10, 2014.
U.S. Appl. No. 14/482,078, filed Sep. 10, 2014.
U.S. Appl. No. 14/482,658, filed Oct. 15, 2014.
U.S. Office Action dated Dec. 17, 2015 in U.S. Appl. No. 14/065,663.
U.S. Office Action dated Nov. 19, 2015 in U.S. Appl. No. 14/083,499.
U.S. Office Action dated Nov. 19, 2015 in U.S. Appl. No. 14/090,668.
U.S. Office Action dated Jan. 11, 2016 in U.S. Appl. No. 14/514,658.
U.S. Office Action dated Feb. 25, 2016 in U.S. Appl. No. 14/072,126.
U.S. Notice of Allowance dated Apr. 4, 2016 in U.S. Appl. No. 14/083,499.
U.S. Notice of Allowance dated Mar. 21, 2016 in U.S. Appl. No. 14/090,668.
U.S. Office Action dated Mar. 10, 2016 in U.S. Appl. No. 14/482,091.
U.S. Office Action dated Jul. 7, 2016 in U.S. Appl. No. 14/072,126.
U.S. Notice of Allowance dated Jul. 12, 2016 in U.S. Appl. No. 14/482,091.
U.S. Office Action dated Sep. 14, 2016 in U.S. Appl. No. 14/482,101.
U.S. Office Action dated Aug. 17, 2016 in U.S. Appl. No. 15/161,499.
U.S. Office of Allowance dated Oct. 7, 2016 in U.S. Appl. No. 15/224,808.

* cited by examiner

BONE CONDUCTION TAGS

BACKGROUND

Bone conduction is a developing communication technology with numerous potential applications. Bone conduction technology has the potential to make interactions with objects more real and tactile in a world that is increasingly virtual. Quick response ("QR") codes and near-field communication ("NFC"), for example, enable users to access information about locations, objects, and services using their mobile device. The process of acquiring such information, however, is often unnatural and can detract from the user experience.

SUMMARY

Concepts and technologies are disclosed herein for bone conduction tags. According to one aspect of the concepts and technologies disclosed herein, a device can receive, via a transducer, a vibration signal from a body of a user. The vibration signal can be generated in response to the user interacting with a bone conduction tag. For example, the vibration signal can be generated in response to the user moving one or more fingers across the bone conduction tag. The device can analyze the vibration signal to determine an action that is to be performed.

In some embodiments, the device can perform the action. In some other embodiments, the device can instruct a further device to perform the action.

In some embodiments, the device is, for example, a desktop, laptop computer, a notebook computer, a tablet computer, a netbook computer, a mobile telephone, a smartphone, a feature phone, a video game system, a handheld video game system, a set-top box, a vehicle computing system, a smart watch, a personal fitness tracker, a safety device, a wearable device, a music playback device, a video playback device, an internet appliance, a television, a personal digital assistant ("PDA"), combinations thereof, or the like.

In some embodiments, the bone conduction tag comprises a plurality of elevations that is utilized to encode data to be sent to the device via the vibration signal. In these embodiments, the user can interact with the bone conduction tag by moving his or her finger across the plurality of elevations thereby generating the vibration signal.

In some embodiments, the bone conduction tag can include a plurality of materials that is utilized to encode data to be sent to the device via the vibration signal. In these embodiments, the user can interact with the bone conduction tag by moving his or her finger across the plurality of materials thereby generating the vibration signal.

In some embodiments, the bone conduction tag can include a material that is modified to encode data to be sent to the device via the vibration signal. In these embodiments, the user can interact with the bone conduction tag by moving his or her finger across the material thereby generating the vibration signal.

According to another aspect of the concepts and technologies disclosed herein, a bone conduction tag includes a substrate that is formed from a material. The substrate can include a plurality of variations that are used to generate a vibration signal that propagates through a bone of a user to a device. The device can analyze the vibration signal to determine an action that is to be performed based upon data encoded in the plurality of variations.

In some embodiments, the substrate is formed from a further material. The plurality of variations can include variations between the material and the further material.

In some embodiments, the plurality of variations can include modifications to the material. The modifications can include abrasions to the materials and/or other modifications to create different vibration signals.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
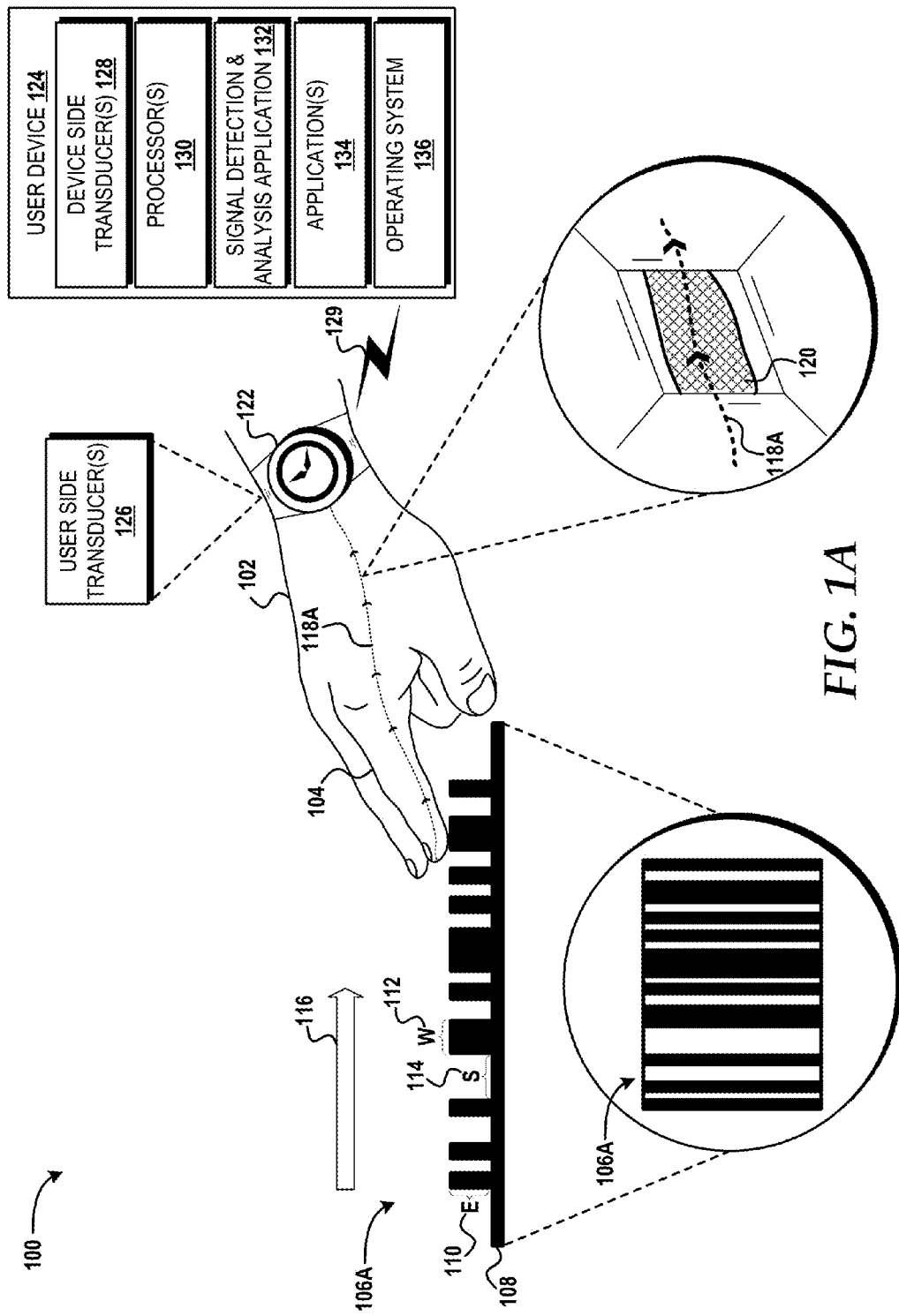
FIGS. 1A-1C are diagrams illustrating aspects of an illustrative operating environment for various concepts disclosed herein, according to an illustrative embodiment.

Bone conduction is a developing communication technology with numerous potential applications. Bone conduction technology has the potential to make interactions with objects more real and tactile in a world that is increasingly virtual. Quick response ("QR") codes and near-field communication ("NFC"), for example, enable users to access information about locations, objects, and services using their mobile device. These processes, however, are often unnatural and can detract from the user experience.

Bone conduction technology can be used to overcome the aforementioned shortcomings. The concepts and technologies disclosed herein not only overcome the unnatural process of accessing information via coded tags, but also introduces new ways of triggering actions, enables new processes for retail services, brings new capabilities and potential security measures to rapidly developing 3D manufacturing technology, and creates innovative opportunities for manufacturing and packaging. The concepts and technologies disclosed herein also are likely much cheaper and more adaptable than radio frequency identification ("RFID") and NFC tags and also do not require a power source like active RFID and NFC tags. As will be described in greater detail herein, one aspect of the concepts and technologies disclosed herein is the use of a bone conduction tag that includes different alternating surfaces and/or materials to encode data. The data can be transmitted through one or more bones of a user via a vibration signal to a device, such as a mobile device or a wearable device, or other system in response to the user moving his or her finger(s) across the bone conduction tag.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of bone conduction tags will be presented.

Referring now to FIG. 1A, aspects of an operating environment 100 in which various embodiments presented herein may be implemented will be described, according to an illustrative embodiment. The illustrated operating environment 100 includes a user's hand 102 with a first finger 104 of the user's hand 102 shown in contact with a bone conduction tag 106A. The bone conduction tag 106A can encode data using physical variations in height of a substrate 108. The physical variations are referred to hereinafter as elevations ("E") 110. The bone conduction tag 106A can encode the data additionally using physical differences in a width ("W") 112 of one or more of the elevations ("E") 110. The bone conduction tag 106A can encode the data additionally using spaces ("S") 114 between the elevations 110.

The substrate 108 of the bone conduction tag 106A can be formed, at least in part, from any material or combination of materials, some examples of which include plastic, composite, metal, paper, cardboard, ceramic, and wood. In some embodiments, the bone conduction tag 106A can be a standalone tag. In some other embodiments, the bone conduction tag 106A can be built-in to or attached to any other object. By way of example, and not limitation, the other object may be a package, a device, a furniture piece, an appliance, a vehicle, a tool, a wall, a door, or a building structure. The bone conduction tag 106A may be attached to a person, such as the user. In some embodiments, the bone conduction tag 106A incorporates Braille to aid a sight-impaired individual.

The bone conduction tag 106A and other bone conduction tags described herein (see FIGS. 1B-1C) can enable manufacturers and retailers to replace NFC tags, QR codes, RFID tags, and/or other similar tagging technologies with bone conduction tags. Bone conduction tags can be incorporated into products and/or product packaging and can provide a more natural customer interaction with products and/or product packaging. Bone conduction tags can be stamped into the packaging during the manufacturing process resulting in a cost reduction relative to RFID and NFC tags, as well as eliminating the power requirements of RFID and NFC tags. Bone conduction tags can be incorporated into 3D printed objects to uniquely identify the machine that created the tag, the owner of the tag, and/or other data. Bone conduction tags can be incorporated into objects to provide usage information and/or to trigger events thereby adding another dimension to the interaction a user has with objects. The bone conduction tags can be incorporated into the surface of the object itself during the manufacturing process. Bone conduction tags can be created or customized by a user and placed on different objects or surfaces (e.g., with an adhesive) and can be used to trigger events and/or actions. Bone conduction tags can eliminate the need for scanners at retail establishments. Retail associates, in one implementation, could utilize a mobile device and bone conduction tags on products to checkout a customer.

In the illustrated example, the elevations 110 of the bone conduction tag 106A each can be representative of a binary digit one ("1") and each of the spaces 114 can be representative of a binary digit zero ("0"). A universal product code ("UPC") includes one or more black bars that each represents the binary digit one ("1") and one or more white bars that each represents the binary digit zero ("0"). A bone conduction tag, such as the bone conduction tag 106A, equivalent to the UPC, would have the black bars, each representative of the binary digit one ("1"), elevated above a baseline of the substrate 108 as shown by the elevations 110, and the white bars, each representative of the binary digit zero ("0"), level with or near the baseline of the substrate 108 as shown by the spaces 114.

As the user contacts the bone conduction tag 106A and moves the first finger 104, and potentially one or more other fingers, in the direction 116 shown, the elevations 110 and the spaces 114 cause a vibration signal 118A to be generated. The vibration signal 118A is representative of the data encoded in the bone conduction tag 106A. The vibration signal 118A can propagate through one or more bones 120 of the user to a wearable device 122 and/or to a user device 124 with which the user may also be in contact.

In some embodiments, the wearable device 122 can receive the vibration signal 118A via one or more user side transducers 126. In some embodiments, the user device 124 can receive the vibration signal 118A directly via one or more device side transducers 128. In some embodiments, the user device 124 can receive the vibration signal 118A from the wearable device 122 via a communication link 129. Establishment of the communication link 129 can be initiated by the wearable device 122 or the user device 124. The communication link 129 can be created using BLUETOOTH, BLUETOOTH LOW ENERGY, NFC, ad-hoc WI-FI, WI-FI, ZIGBEE, other radio frequency technologies, infrared, infrared data association ("IRDA"), combinations thereof, and the like. Alternatively, the communication link 129 can be or can include a wired connection established between the wearable device 122 and the user device 124. Moreover, multiple wireless and/or wired connections can be utilized between the wearable device 122 and the user device 124 and/or one or more other devices that each include, for example, one or more of transducers. As such, the configuration shown in this regard should not be construed as being limiting in any way.

In the illustrated embodiment, the wearable device 122 is a smartwatch, although the wearable device 122 may be other jewelry such as a necklace, ring, bracelet, anklet, or earring, or any other device that is wearable by the user. The wearable device 122 alternatively may be embedded within tissue of the user (e.g., as a tattoo or implanted device).

The user side transducer(s) 126 can be built-in to the wearable device 122 as shown. The user side transducer(s) 126 can be attached to the wearable device 122. The user side transducer(s) 126 can be built-in to another device that is attached to or worn by the user. The user side transducer(s) 126 can be attached to another device that is attached to or worn by the user. The user side transducer(s) 126 can be attached to or worn directly on the skin (e.g., as a tattoo or part of a tattoo), underneath the skin, or within the body of the user (e.g., as an implantation device). As such, the user side transducer(s) 126 being built-in to the wearable device 122 in the illustrated embodiment should not be construed as being limiting in any way.

The user side transducer(s) 126, in some embodiments, are piezoelectric transducers, such as contact microphones or other electro-acoustic transducers. The user side transducer(s) 126 can receive the vibration signal 118A after propagating through the bone(s) 120 of the user. The user side transducer(s) 126 can vibrate in accordance with the vibration signal 118A. In some embodiments, the wearable device 122 can analyze the vibration signal 118A and can perform one or more actions and/or can trigger the user device 124 to perform one or more operations in response based upon the data encoded in the vibration signal 118A. In some other embodiments, the wearable device 122 can receive the vibration signal 118A and provide the vibration signal 118A to the user device 124 via the communication link 129 or through further bone conduction to the device side transducer(s) 128. The device side transducer(s) 128 may separately receive the vibration signal 118A

The user device 124, in some embodiments, is or includes a desktop, laptop computer, a notebook computer, a tablet computer, a netbook computer, a mobile telephone, a smartphone, a feature phone, a video game system, a handheld video game system, a set-top box, a vehicle computing system, a smart watch, a personal fitness tracker, a safety device, a wearable device, a music playback device, a video playback device, an internet appliance, a television, a personal digital assistant ("PDA"), combinations thereof, or the like. It should be understood that the functionality of the user device 124 can be provided by a single device, by two or more similar devices, and/or by two or more dissimilar devices.

The user device 124 can receive the vibration signal 118A via the device side transducer(s) 128. The device side transducer(s) 128, in some embodiments, are piezoelectric transducers, such as contact microphones or other electro-acoustic transducers. The device side transducer(s) 128 can be built-in to the user device 124. The device side transducer(s) 128 can be attached to the user device 124. The device side transducer(s) 128 can be built-in to a case that is placed on the user device 124. The device side transducer(s) 128 can be built-in to a display (not shown) of the user device 124 and/or any other component of the user device 124. As such, the device side transducer(s) 128 being built-in to the user device 124 in the illustrated embodiment should not be construed as being limiting in any way.

The user device 124 can execute, via one or more processors 130, a signal detection and analysis application 132 to detect the vibration signal 118A received by the device side transducer(s) 128, to analyze the vibration signal 118A, and to perform one or more actions and/or to trigger the user device 124 to perform one or more operations in response based upon the data encoded in the vibration signal 118A. Alternatively, the user device 124 can receive the vibration signal 118A from the wearable device 122 via the communication link 129. It should be understood that the wearable device 122 also can include one or more processors and a signal detection and analysis application to perform the operations described herein.

One or more signal characteristics (e.g., amplitude, frequency, and/or phase) of the vibration signal 118A can be modified during propagation through the user's body by, for example, the height, weight, body fat percentage, body muscle percentage, and/or bone characteristics such as bone density, bone structure, and bone mass of the user's body. In some embodiments, the signal detection and analysis application 132 can utilize a baseline reference signal that includes signal characteristics indicative of the effects the bone(s) 120 of the user so that the characteristics of the baseline reference signal can be removed from the vibration signal 118A to isolate the characteristics of the vibration signal 118A that are indicative of the data encoded in the bone conduction tag 106A.

The vibration signal 118A can trigger the user device 124 to perform one or more actions. The action(s) may be carried out via execution, by the processor(s) 130, of one or more applications 134 and/or an operating system 136. The application(s) 134 can include, but are not limited to, productivity applications, entertainment applications, video applications, music applications, video game applications, camera applications, messaging applications, social network applications, enterprise applications, map applications, security applications, presence applications, visual voice mail applications, text-to-speech applications, speech-to-text applications, email applications, calendar applications, camera applications, web browser applications, and the like. The application(s) 134 can execute on top of the operating system 136.

The operating system 136 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way. The signal detection and analysis application 132 can be a standalone application or can be included as part of the application(s) 134 or the operating system 136. In some embodiments, operations available from the signal detection and analysis application 132 can be exposed via one or more application programming interfaces ("APIs") (not shown).

Figure 1B:
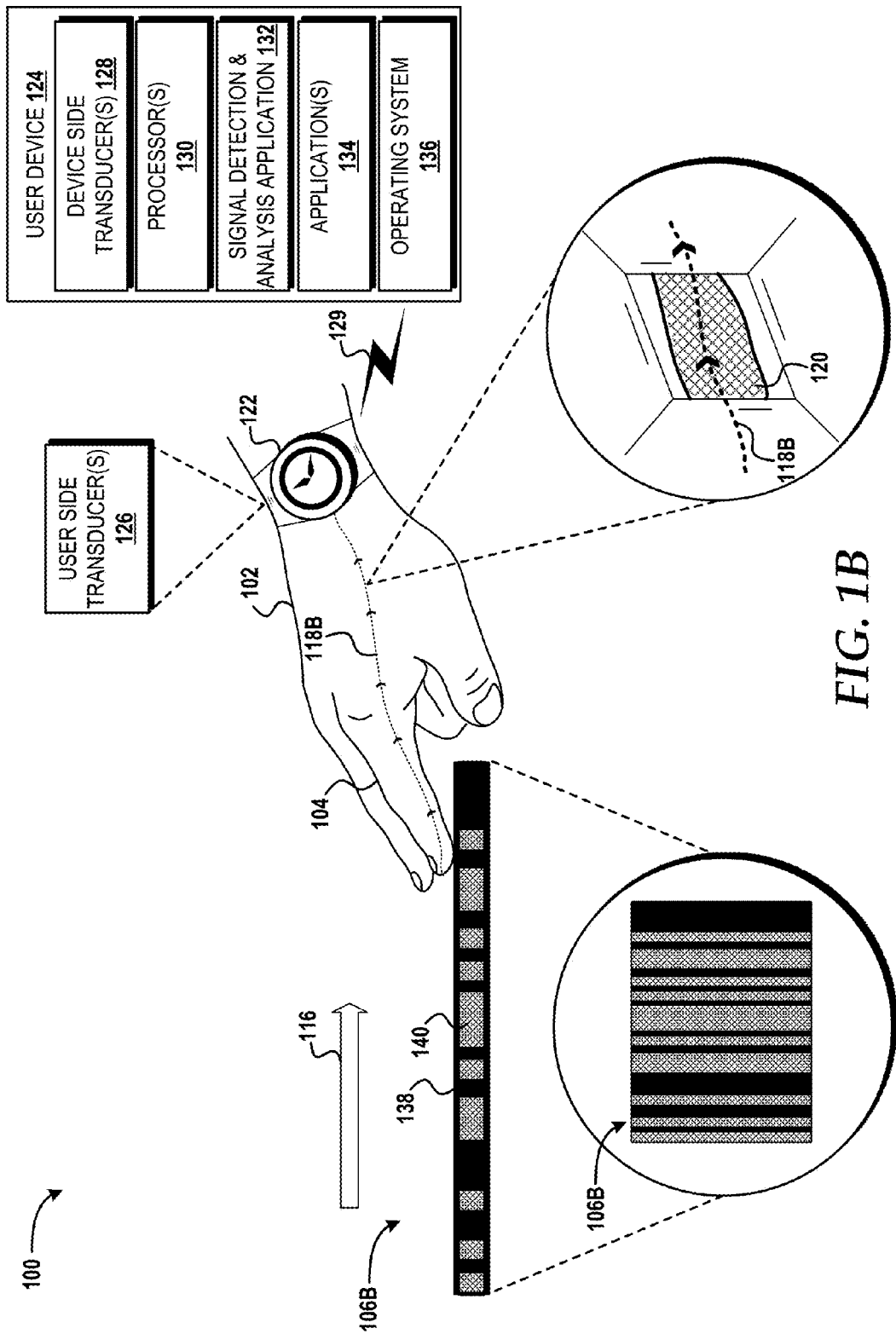

Turning now to FIG. 1B, the operating environment 100 introduced in FIG. 1A is again shown. The bone conduction tag 106A has been replaced by another bone conduction tag 106B. The bone conduction tag 106B can encode data using different materials as an alternative to the elevations 110 of the bone conduction tag 106A described above with reference to FIG. 1A. The bone conduction tag 106B can be formed from two or more materials selected to provide detectable variations in a vibration signal 118B. For example, as shown in FIG. 1B, the bone conduction tag 106B can be formed from a first material 138 and a second material 140, each providing one or more detectable variations in the resulting vibration signal 118B generated when the first finger 104, and potentially one or more other fingers, of the user contacts the bone conduction tag 106B and moves in the direction 116 shown. The bone conduction tag 106A described above in view of FIG. 1A utilizes binary encoding. The bone conduction tag 106B can use binary encoding, but alternatively can use three or more states to encode data. The number of states used for encoding data using the bone conduction tag 106B can be defined, for example, by the number of materials involved and how much each material differs from the other(s) in the resulting vibration signal 118B.

Figure 1C:
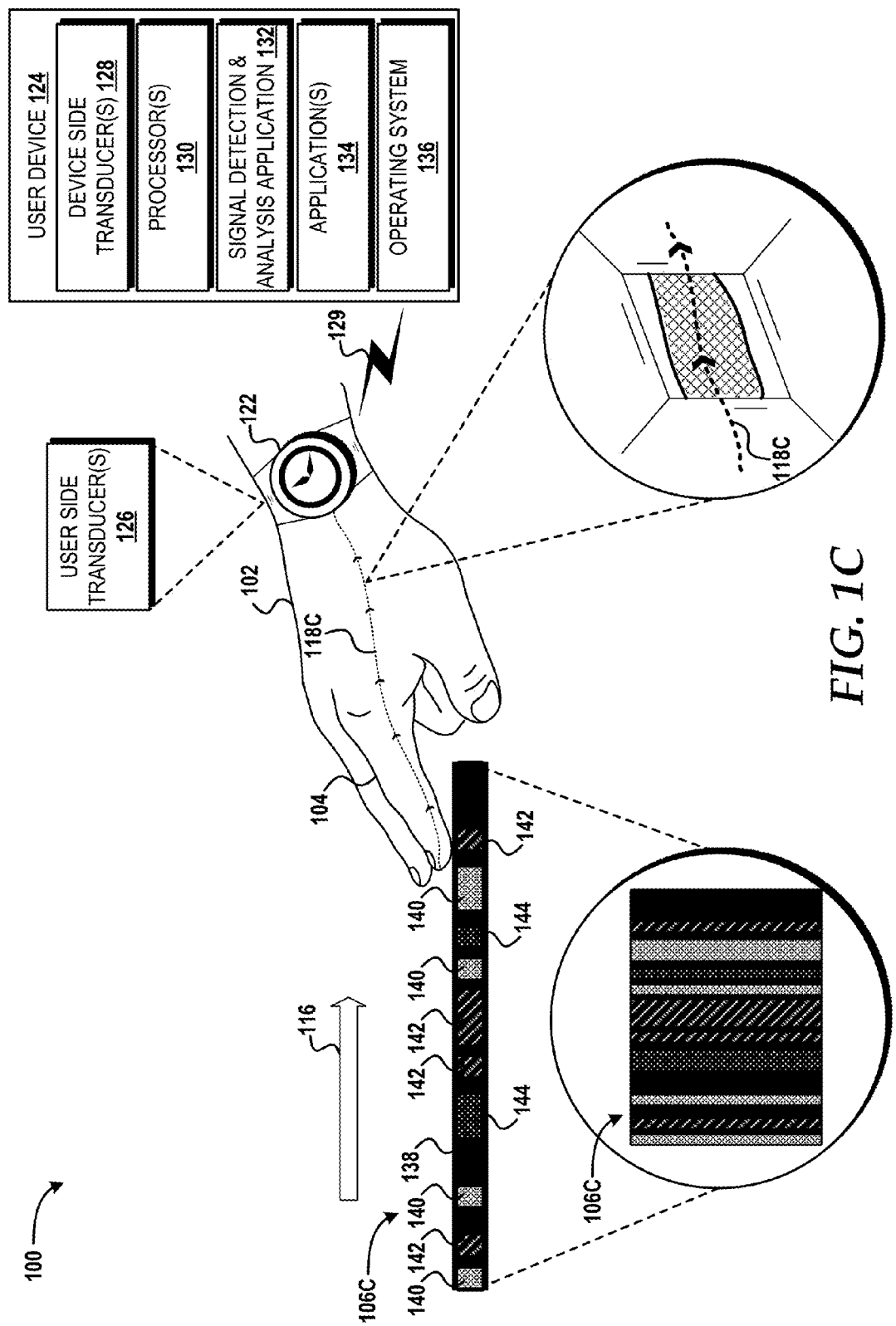

Turning now to FIG. 1C, the operating environment 100 introduced in FIG. 1A is again shown. The bone conduction tag 106A has been replaced by another bone conduction tag 106C. The bone conduction tag 106C can encode data by using different materials or a modified material as an alternative to the elevations 110 of the bone conduction tag 106A described above with reference to FIG. 1A. For example, as shown in FIG. 1C, the bone conduction tag 106C can be formed from a first material 138, a second material 140, a third material 142, and a fourth material 144, each providing one or more detectable variations in the resulting vibration signal 118C generated when the first finger 104, and potentially one or more other fingers, of the user contacts the bone conduction tag 106C and moves in the direction 116 shown. In some embodiments, the materials 138-144 are the same material that has been abraded or otherwise modified to create different vibration signals. The bone conduction tag 106C enable more than two states to be encoded by using different surface modifications to achieve different vibrations. The bone conduction tag 106C therefore provides the simplicity and cost effective aspect of the bone conduction tag 106A as well as the larger encoding capabilities of the bone conduction tag 106B.

Figure 2:
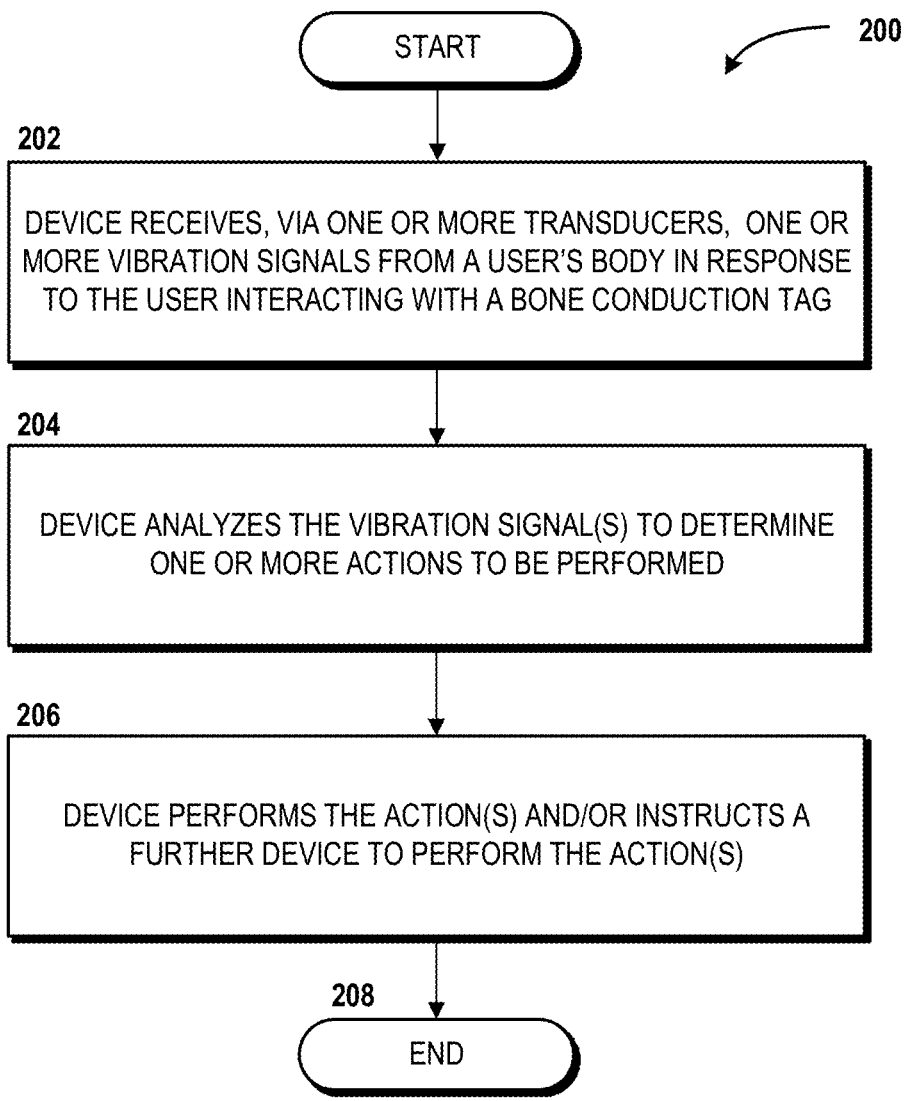
FIG. 2 is a flow diagram illustrating aspects of a method for reading a bone conduction tag via bone conduction, according to another illustrative embodiment.

Turning now to FIG. 2, aspects of a method 200 for reading a bone conduction tag, such as any of the bone conduction tags 106A-106C described above, via bone conduction will be described, according to an illustrative embodiment. It should be understood that the operations of the methods are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the user device 124, the wearable device 122, single-processor or multiprocessor systems, minicomputers, mainframe computers, personal computers, hand-held computing devices, microprocessor-based, programmable consumer electronics, other devices and systems disclosed herein, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing one or more processors, such as the processor(s) 130 of the user device 124, one or more processors of the wearable device 122, one or more processors of any other device or system disclosed herein, to perform one or more operations and/or causing one or more processors to direct other components of the computing system or device to perform one or more of the operations.

For purposes of illustrating and describing some of the concepts of the present disclosure, the methods disclosed herein are described as being performed, at least in part, by the user device 124 via execution, by the processor(s) 130, of one or more software modules and/or software applications, such as, for example, the signal detection and analysis application 132, the application(s) 134, and/or the operating system 136, and/or by similar components of the wearable device 122. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIGS. 1A-1C. The method 200 begins at operation 202, where a device, such as the user device 124 or the wearable device 122, receives, via one or more transducers, such as the device side transducer(s) 128 or the user side transducer(s) 126, one or more vibration signals, such as one or more of the vibration signals 118A-118C, from a user's body in response to the user interacting with one or more bone conduction tags, such as one or more of the bone conduction tags 106A-106C. The remainder of the method 200 will be described in context of the user device 124, the device side transducer(s) 128, the bone conduction tag 106A, and the vibration signal 118A as shown in FIG. 1A.

From operation 202, the method 200 proceeds to operation 204, where the user device 124, and more particularly, the signal detection and analysis application 132 via execution by the processor(s) 130, analyzes the vibration signal 118A to determine one or more actions to be performed. The signal detection and analysis application 132 may analyze one or more features/characteristics of the vibration signal 118A, including, for example, amplitude, frequency, and/or phase. In some embodiments, the user device 124 provides the vibration signal 118A to a remote device or system (e.g., a remote server) that performs the analysis and instructs the user device 124 to perform one or more actions based upon the analysis.

The action(s) can be or can include establishing one or more wireless connections, launching one or more applications (e.g., the application(s) 134), launching a website, launching a web application, combinations thereof, and the like. Another action can be used in a store environment during customer checkout, wherein an associate of the store swipes a bone conduction tag and/or the customer swipes the bone conduction tag thereby causing an associated item to be added to a "shopping cart," invoice, or other listing of items the customer might purchase. Alternatively, swiping a bone conduction tag in this implementation might cause an immediate or delayed purchase of the associated item(s). Another action can be input received by the user device 124, which may be associated with one or more of the applications(s) 134. Another action can be the selection of a system or device that operates remotely from the user device 124.

In some embodiments, the signal detection and analysis application 132 via execution by the processor(s) 130, analyzes the vibration signal 118A at least by comparing the vibration signal 118A to tag data stored by the user device 124 and/or stored remotely from the user device 124 to determine whether a match or approximate match (e.g., a match with a percentage greater than or equal to a minimum match percentage) exists. This comparison operation may function, in some embodiments, as a lookup table operation. Each stored tag might have an associated action, such as described above, which is carried out when the vibration signal 118A is matched to the corresponding stored tag. In some implementations, a tag might be associated with more than one action. Moreover, in some implementations, a tag might be associated with other information (e.g., time of day, location, and/or other contextual data) that the signal detection and analysis application 132 can utilize to determine which action(s) is/are appropriate.

In some other embodiments, the vibration signal 118A can be an instruction directed to the user device 124, the wearable device 122, another system, another device, or some combination thereof. The instruction can be carried out by the receiving device upon or after receipt of the vibration signal 118A. For example, the vibration signal 118A might be analyzed by the user device 124 and found to contain an IP address to which the user device 124 then connects. In other embodiments, the vibration signal 118A is not an instruction or stored tag, but rather other information that might be of use to the user, the user device 124, the wearable device 122, another system, another device, or some combination of device(s)/system(s). These and the embodiments presented immediately above may be combined in any way into a single bone conduction tag.

From operation 204, the method 200 proceeds to operation 206, where the user device 124 performs the action(s). In addition or as an alternative, the user device 124 can instruct a further device, such as the wearable device 122, to perform the action(s).

From operation 206, the method 200 proceeds to operation 208. The method 200 ends at operation 208.

Figure 3:
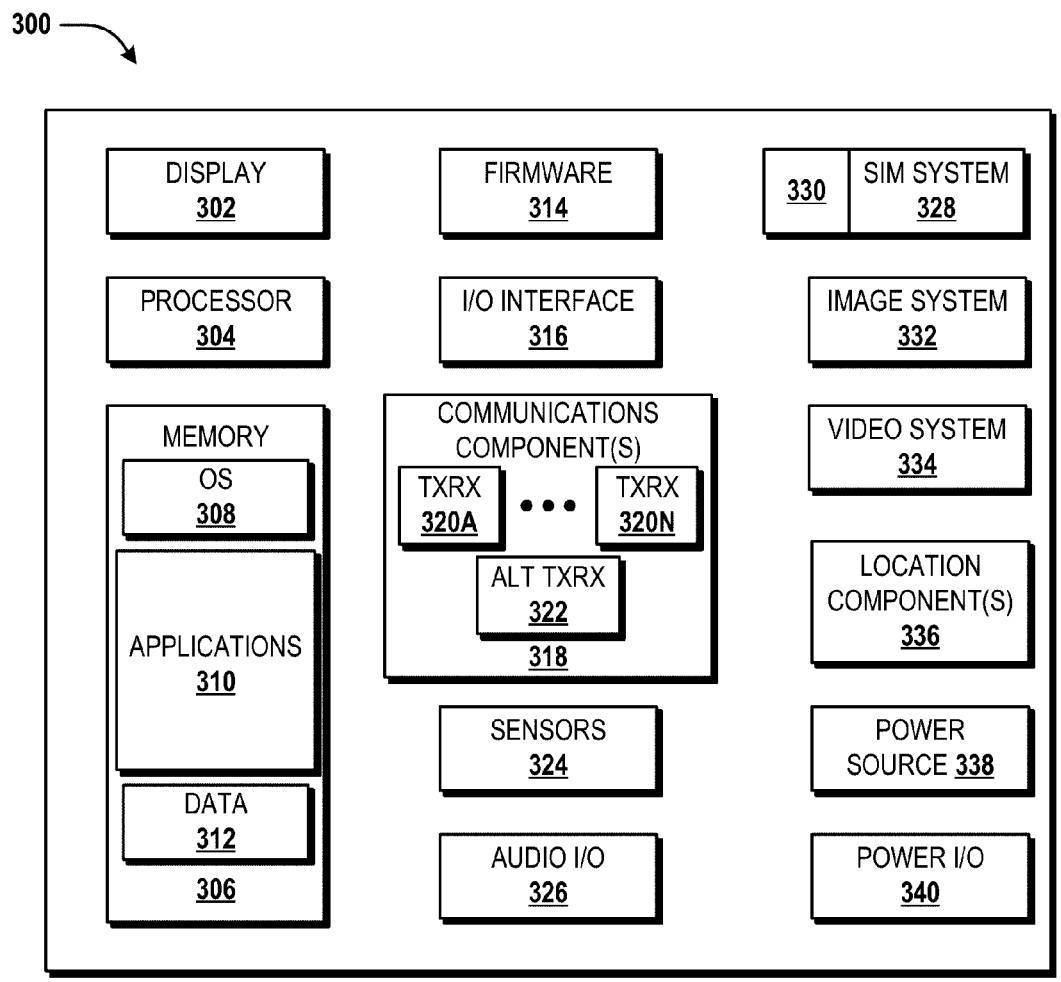
FIG. 3 is a block diagram illustrating an example mobile device capable of implementing aspects of the embodiments disclosed herein.

Turning now to FIG. 3, an illustrative mobile device 300 and components thereof will be described. In some embodiments, the user device 124 and/or the wearable device 122 described above can be configured as and/or can have an architecture similar or identical to the mobile device 300 described herein in FIG. 3. It should be understood, however, that the user device 124 and/or the wearable device 122 may or may not include the functionality described herein with reference to FIG. 3. While connections are not shown between the various components illustrated in FIG. 3, it should be understood that some, none, or all of the components illustrated in FIG. 3 can be configured to interact with one other to carry out various device functions. In some embodiments, the components are arranged so as to communicate via one or more busses (not shown). Thus, it should be understood that FIG. 3 and the following description are intended to provide a general understanding of a suitable environment in which various aspects of embodiments can be implemented, and should not be construed as being limiting in any way.

As illustrated in FIG. 3, the mobile device 300 can include a display 302 for displaying data. According to various embodiments, the display 302 can be configured to display various graphical user interface ("GUI") elements, text, images, video, advertisements, various prompts, virtual keypads and/or keyboards, messaging data, notification messages, metadata, internet content, device status, time, date, calendar data, device preferences, map and location data, combinations thereof, and the like. The mobile device 300 also can include a processor 304 (e.g., the processor 130), and a memory or other data storage device ("memory") 306. The processor 304 can be configured to process data and/or can execute computer-executable instructions stored in the memory 306. The computer-executable instructions executed by the processor 304 can include, for example, an operating system 308 (e.g., the operating system 136) one or more applications 310 (e.g., the signal detection and analysis application 132 and/or the application(s) 134), other computer-executable instructions stored in a memory 306, or the like. In some embodiments, the applications 310 also can include a UI application (not illustrated in FIG. 3).

The UI application can interface with the operating system 308 to facilitate user interaction with functionality and/or data stored at the mobile device 300 and/or stored elsewhere. In some embodiments, the operating system 308 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 304 to aid a user in entering content, viewing account information, answering/initiating calls, entering/deleting data, entering and setting user IDs and passwords for device access, configuring settings, manipulating address book content and/or settings, multimode interaction, interacting with other applications 310, and otherwise facilitating user interaction with the operating system 308, the applications 310, and/or other types or instances of data 312 that can be stored at the mobile device 300. The data 312 can include user preferences, user settings, and/or other data. The applications 310 can include, for example, the signal detection and analysis application 132, the application(s) 134, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 310, the data 312, and/or portions thereof can be stored in the memory 306 and/or in a firmware 314, and can be executed by the processor 304. The firmware 314 also can store code for execution during device power up and power down operations. It can be appreciated that the firmware 314 can be stored in a volatile or non-volatile data storage device including, but not limited to, the memory 306 and/or a portion thereof.

The mobile device 300 also can include an input/output ("I/O") interface 316. The I/O interface 316 can be configured to support the input/output of data such as location information, user information, organization information, presence status information, user IDs, passwords, and application initiation (start-up) requests. In some embodiments, the I/O interface 316 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 300 can be configured to synchronize with another device to transfer content to and/or from the mobile device 300. In some embodiments, the mobile device 300 can be configured to receive updates to one or more of the applications 310 via the I/O interface 316, though this is not necessarily the case. In some embodiments, the I/O interface 316 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 316 may be used for communications between the mobile device 300 and a network device or local device.

The mobile device 300 also can include a communications component 318. The communications component 318 can be configured to interface with the processor 304 to facilitate wired and/or wireless communications with one or more networks. In some embodiments, other networks include networks that utilize non-cellular wireless technologies such as WI-FI or WIMAX. In some embodiments, the communications component 318 includes a multimode communications subsystem for facilitating communications via the cellular network and one or more other networks.

The communications component 318, in some embodiments, includes one or more transceivers. The one or more transceivers, if included, can be configured to communicate over the same and/or different wireless technology standards with respect to one another. For example, in some embodiments one or more of the transceivers of the communications component 318 may be configured to communicate using Global System for Mobile communication ("GSM"), Code Division Multiple Access ("CDMA"), CDMAONE, CDMA2000, Long-Term Evolution ("LTE"), and various other 2G, 2.5G, 3G, 4G, and greater generation technology standards. Moreover, the communications component 318 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

In addition, the communications component 318 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed Highs-Speed Uplink Packet Access ("HSUPA"), HSPA+, and various other current and future wireless data access standards. In the illustrated embodiment, the communications component 318 can include a first transceiver ("TxRx") 320A that can operate in a first communications mode (e.g., GSM). The communications component 318 also can include an $N^{th}$ transceiver ("TxRx") 320N that can operate in a second communications mode relative to the first transceiver 320A (e.g., UMTS). While two transceivers 320A-N (hereinafter collectively and/or generically referred to as "transceivers 320") are shown in FIG. 3, it should be appreciated that less than two, two, and/or more than two transceivers 320 can be included in the communications component 318.

The communications component 318 also can include an alternative transceiver ("Alt TxRx") 322 for supporting other types and/or standards of communications. According to various contemplated embodiments, the alternative transceiver 322 can communicate using various communications technologies such as, for example, WI-FI, WIMAX, BLUETOOTH, infrared, IRDA, NFC, other RF technologies, combinations thereof, and the like, and can support the communication link 129 shown in FIGS. 1A-1C.

In some embodiments, the communications component 318 also can facilitate reception from terrestrial radio networks, digital satellite radio networks, internet-based radio service networks, combinations thereof, and the like. The communications component 318 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 300 also can include one or more sensors 324. The sensors 324 can include temperature sensors, light sensors, air quality sensors, movement sensors, orientation sensors, noise sensors, proximity sensors, or the like. As such, it should be understood that the sensors 324 can include, but are not limited to, accelerometers, magnetometers, gyroscopes, infrared sensors, noise sensors, microphones, combinations thereof, or the like. Additionally, audio capabilities for the mobile device 300 may be provided by an audio I/O component 326. The audio I/O component 326 of the mobile device 300 can include one or more speakers for the output of audio signals, one or more microphones for the collection and/or input of audio signals, and/or other audio input and/or output devices.

The illustrated mobile device 300 also can include a subscriber identity module ("SIM") system 328. The SIM system 328 can include a universal SIM ("USIM"), a universal integrated circuit card ("UICC") and/or other identity devices. The SIM system 328 can include and/or can be connected to or inserted into an interface such as a slot interface 330. In some embodiments, the slot interface 330 can be configured to accept insertion of other identity cards or modules for accessing various types of networks. Additionally, or alternatively, the slot interface 330 can be configured to accept multiple subscriber identity cards. Because other devices and/or modules for identifying users and/or the mobile device 300 are contemplated, it should be understood that these embodiments are illustrative, and should not be construed as being limiting in any way.

The mobile device 300 also can include an image capture and processing system 332 ("image system"). The image system 332 can be configured to capture or otherwise obtain photos, videos, and/or other visual information. As such, the image system 332 can include cameras, lenses, charge-coupled devices ("CCDs"), combinations thereof, or the like. The mobile device 300 may also include a video system 334. The video system 334 can be configured to capture, process, record, modify, and/or store video content. Photos and videos obtained using the image system 332 and the video system 334, respectively, may be added as message content to an MMS message, email message, and sent to another mobile device. The video and/or photo content also can be shared with other devices via various types of data transfers via wired and/or wireless communication devices as described herein.

The mobile device 300 also can include one or more location components 336. The location components 336 can be configured to send and/or receive signals to determine a geographic location of the mobile device 300. According to various embodiments, the location components 336 can send and/or receive signals from global positioning system ("GPS") devices, assisted-GPS ("A-GPS") devices, WI-FI/WIMAX and/or cellular network triangulation data, combinations thereof, and the like. The location component 336 also can be configured to communicate with the communications component 318 to retrieve triangulation data for determining a location of the mobile device 300. In some embodiments, the location component 336 can interface with cellular network nodes, telephone lines, satellites, location transmitters and/or beacons, wireless network transmitters and receivers, combinations thereof, and the like. In some embodiments, the location component 336 can include and/or can communicate with one or more of the sensors 324 such as a compass, an accelerometer, and/or a gyroscope to determine the orientation of the mobile device 300. Using the location component 336, the mobile device 300 can generate and/or receive data to identify its geographic location, or to transmit data used by other devices to determine the location of the mobile device 300. The location component 336 may include multiple components for determining the location and/or orientation of the mobile device 300.

The illustrated mobile device 300 also can include a power source 338. The power source 338 can include one or more batteries, power supplies, power cells, and/or other power subsystems including alternating current ("AC") and/or direct current ("DC") power devices. The power source 338 also can interface with an external power system or charging equipment via a power I/O component 340. Because the mobile device 300 can include additional and/or alternative components, the above embodiment should be understood as being illustrative of one possible operating environment for various embodiments of the concepts and technologies described herein. The described embodiment of the mobile device 300 is illustrative, and should not be construed as being limiting in any way.

Figure 4:
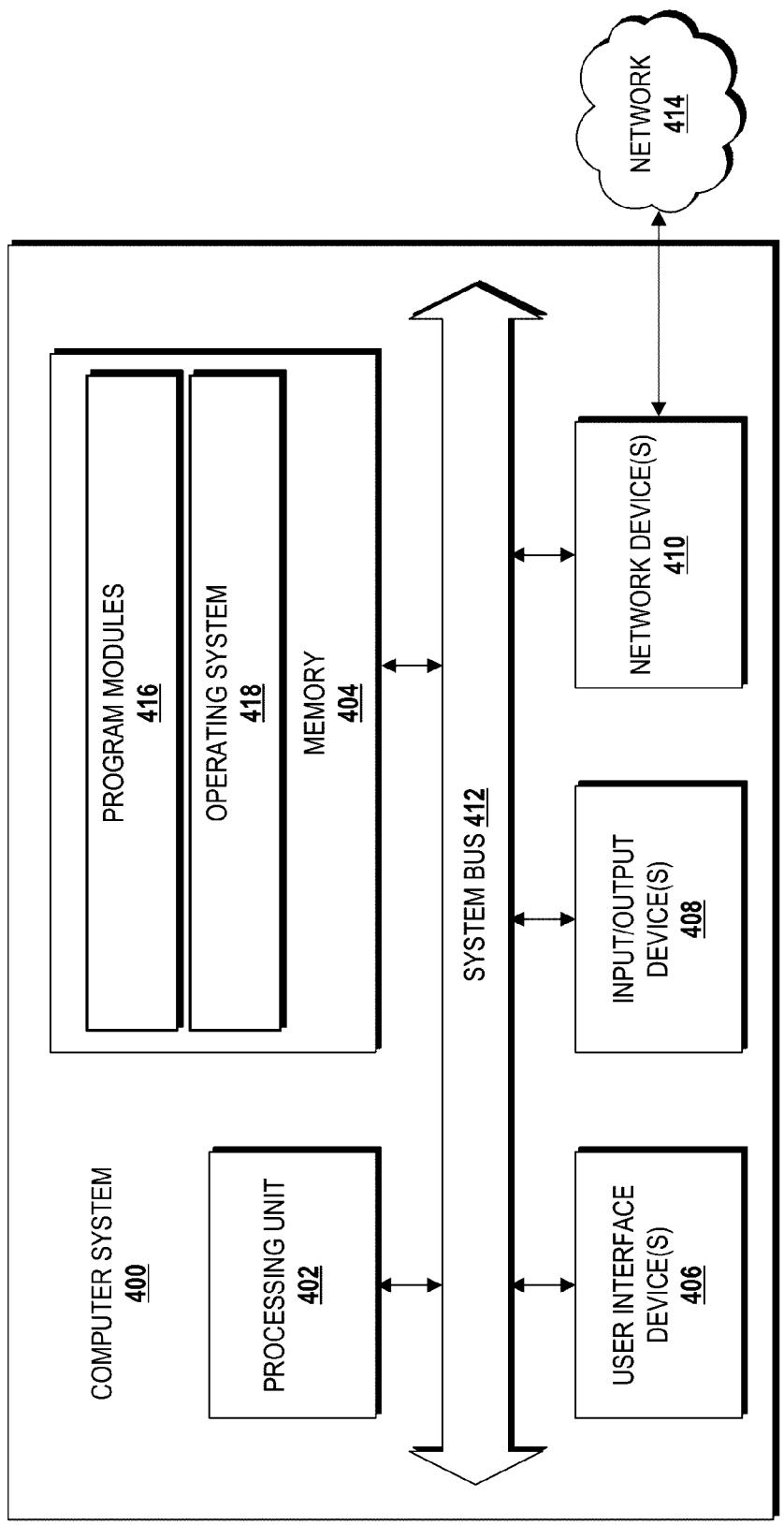
FIG. 4 is a block diagram illustrating an example computer system capable of implementing aspects of the embodiments presented herein.

FIG. 4 is a block diagram illustrating a computer system 400 configured to provide the functionality in accordance with various embodiments of the concepts and technologies disclosed herein. In some implementations, the user device 124 and/or the wearable device 122 is configured to utilize an architecture that is the same as or similar to the architecture of the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The memory 404 includes an operating system 418 (e.g., the operating system 136) and one or more program modules 416. The operating system 418 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. The program modules 416 can include, for example, the signal detection and analysis application 132 and/or the application(s) 134. The program modules 416 and/or other programs can be embodied in computer-readable media containing instructions that, when executed by the processing unit 402, perform one or more of the operations described herein. According to embodiments, the program modules 416 may be embodied in hardware, software, firmware, or any combination thereof. The memory 404 can also store other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network 414. Examples of the network devices 410 include, but are not limited to, a modem, a radio frequency ("RF") or IR transceiver, a telephonic interface, a bridge, a router, or a network card. The network 414 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 414 may be a wired network such as, but not limited to, a Wide Area Network ("WAN"), a wired LAN such as provided via Ethernet, a wired Personal Area Network ("PAN"), or a wired Metropolitan Area Network ("MAN").

Figure 5:
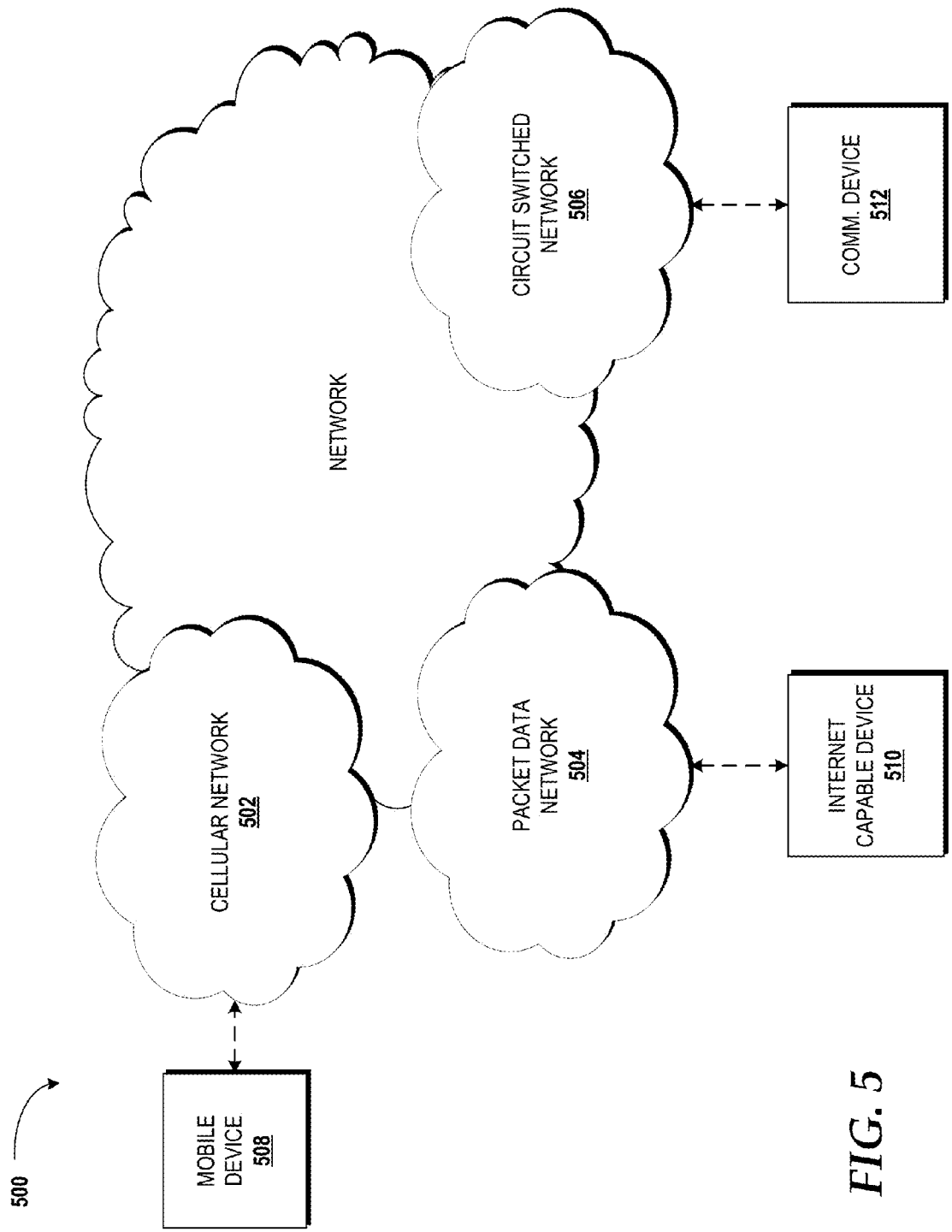
FIG. 5 schematically illustrates a network, according to an illustrative embodiment.

Turning now to FIG. 5, details of a network 500 will be described, according to an illustrative embodiment. The network 500 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, the user device 124, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards such as LTE, or the like, as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, the user device 124, the wearable device 122, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, the user device 124, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510.

Based on the foregoing, it should be appreciated that concepts and technologies directed to bone conduction tags have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A computer storage medium that stores computer-readable instructions that, when executed by a processor of a device, cause the device to perform operations comprising:
    receiving, via a transducer, a vibration signal from a body of a user, wherein the vibration signal is generated in response to the user physically interacting with a bone conduction tag, wherein the bone conduction tag comprises a substrate, wherein the bone conduction tag comprises data encoded using at least a portion of a plurality of variations in the substrate, and wherein the vibration signal is representative of the data encoded using at least the portion of the plurality of variations of the substrate; and
    analyzing the vibration signal to determine an action to be performed.

2. The computer storage medium of claim 1, wherein the operations further comprise performing the action.

3. The computer storage medium of claim 1, wherein the operations further comprise instructing a further device to perform the action.

4. The computer storage medium of claim 1, wherein analyzing the vibration signal to determine the action to be performed comprises comparing the vibration signal to tag data, and wherein the tag data uniquely identifies the bone conduction tag and the action associated therewith.

5. The computer storage medium of claim 1, wherein the action comprises establishing a wireless connection.

6. The computer storage medium of claim 1, wherein the action comprises adding an item associated with the bone conduction tag into a list of items that the user might purchase.

7. The computer storage medium of claim 1, wherein the action comprises launching an application.

8. A device comprising:
    a transducer;
    a processor; and
    a memory that stores instructions that, when executed by the processor, cause the processor to perform operations comprising:
        receiving, via the transducer, a vibration signal from a body of a user, wherein the vibration signal is generated in response to the user physically interacting with a bone conduction tag, wherein the bone conduction tag comprises a substrate, wherein the bone conduction tag comprises data encoded using at least a portion of a plurality of variations of the substrate, and wherein the vibration signal is representative of the data encoded using at least the portion of the plurality of variations of the substrate, and
        analyzing the vibration signal to determine an action to be performed.

9. The device of claim 8, wherein the operations further comprise performing the action.

10. The device of claim 8, wherein the operations further comprise instructing a further device to perform the action.

11. The device of claim 10, wherein the further device comprises a wearable device that is worn by the user.

12. A bone conduction tag comprising:
    a substrate formed from a first material and comprising a plurality of variations, wherein the plurality of variations, when physically interacted with by a user, cause a vibration signal to be generated; and
    data encoded in the plurality of variations, wherein the vibration signal propagates through a bone of the user to a device that analyzes the vibration signal to determine an action to be performed based upon the data encoded in the plurality of variations.

13. The bone conduction tag of claim 12, wherein the substrate is formed further from a second material; and wherein the plurality of variations comprises variations between the first material and the second material.

14. The bone conduction tag of claim 12, wherein the plurality of variations comprises modifications to the first material.

15. The bone conduction tag of claim 12, wherein the plurality of variations comprises a plurality of elevations, wherein each of the plurality of elevations comprises a width, and wherein the data encoded in the plurality of variations is encoded, at least in part, based upon physical differences between widths of the plurality of elevations.

16. The bone conduction tag of claim 15, wherein the plurality of variations further comprises a plurality of spaces between the plurality of elevations, and wherein the data encoded in the plurality of variations is encoded, at least in part, based upon the plurality of spaces.

17. The bone conduction tag of claim 16, wherein each of the plurality of elevations is representative of a binary digit one and each of the plurality of spaces is representative of a binary digit zero.

18. The bone conduction tag of claim 12, wherein the bone conduction tag is built-in to an object.

19. The bone conduction tag of claim 12, wherein the bone conduction tag is attached to an object.

20. The bone conduction tag of claim 12, wherein the bone conduction tag is a stand-alone tag.

* * * * *